(12) United States Patent
Steinhilb et al.

(10) Patent No.: US 9,278,715 B2
(45) Date of Patent: Mar. 8, 2016

(54) HOOD INNER DESIGN FOR PEDESTRIAN PROTECTION

(71) Applicant: Toyota Motor Engineering & Manufacturing North America, Inc., Erlanger, KY (US)

(72) Inventors: Aaron Richard Steinhilb, Westland, MI (US); Jeremiah Thomas Hammer, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/973,048

(22) Filed: Aug. 22, 2013

(65) Prior Publication Data

US 2015/0054305 A1 Feb. 26, 2015

(51) Int. Cl.
*B62D 25/10* (2006.01)
*B60R 21/34* (2011.01)

(52) U.S. Cl.
CPC .............. *B62D 25/105* (2013.01); *B60R 21/34* (2013.01); *B60R 2021/343* (2013.01)

(58) Field of Classification Search
CPC ........ B60R 19/02; B60R 21/34; B60R 21/38; B62D 25/10; B62D 25/105; B62D 25/12
USPC .......... 296/187.04, 187.09, 193.11; 180/69.2, 180/69.21, 271, 274
See application file for complete search history.

(56) References Cited

U.S. PATENT DOCUMENTS

| | | | |
|---|---|---|---|
| 7,467,680 B2 | 12/2008 | Mason | |
| 7,631,928 B2 * | 12/2009 | Ackland et al. | 296/193.11 |
| 7,984,943 B2 * | 7/2011 | Iwano et al. | 296/193.11 |
| 8,136,870 B2 * | 3/2012 | Ott et al. | 296/192 |
| 8,356,857 B2 * | 1/2013 | Ralston et al. | 296/187.04 |
| 8,403,405 B2 * | 3/2013 | Ikeda et al. | 296/193.11 |
| 2007/0132279 A1 * | 6/2007 | Donabedian et al. | 296/193.11 |
| 2009/0121519 A1 * | 5/2009 | Ackland et al. | 296/187.09 |
| 2011/0169303 A1 * | 7/2011 | Ikeda et al. | 296/193.11 |
| 2012/0217761 A1 * | 8/2012 | Nakamura et al. | 292/97 |

FOREIGN PATENT DOCUMENTS

| | | | |
|---|---|---|---|
| JP | 2008110668 A | * | 5/2008 |
| WO | 2012/153344 A2 | | 11/2012 |
| WO | WO 2013087424 A1 | * | 6/2013 |

OTHER PUBLICATIONS

Japanese to English translation of JP 2008-110668; retreived Aug. 10, 2015 via the Japanese Platform for Patent Information located at https://www.j-platpat.inpit.go.jp/web/all/top/BTmTopEnglishPage.*
French to English translation of WO 2013/087424; retreved Aug. 10, 2015 via the European Patent Office PatentTransalte located at http://www.epo.org/.*
Kerkeling et al., "Structural Hood and Hinge Concepts for Pedestrian Protection" paper 05-0304, Experimental Safety Vehicles Conference, 2005.

* cited by examiner

*Primary Examiner* — Jason S Daniels
(74) *Attorney, Agent, or Firm* — Christopher G. Darrow; Darrow Mustafa PC

(57) ABSTRACT

A hood and, in particular, a hood inner panel for increasing pedestrian safety during a collision between a pedestrian and a motor vehicle. The hood inner panel includes two regions separated by an angled wall or a reinforcing structure which increases local rigidity. The rigidity of the hood inner panel in the vicinity of the angled wall is then adjusted for energy absorption by the inclusion of apertures which can increase the deformability of the hood inner panel.

15 Claims, 6 Drawing Sheets

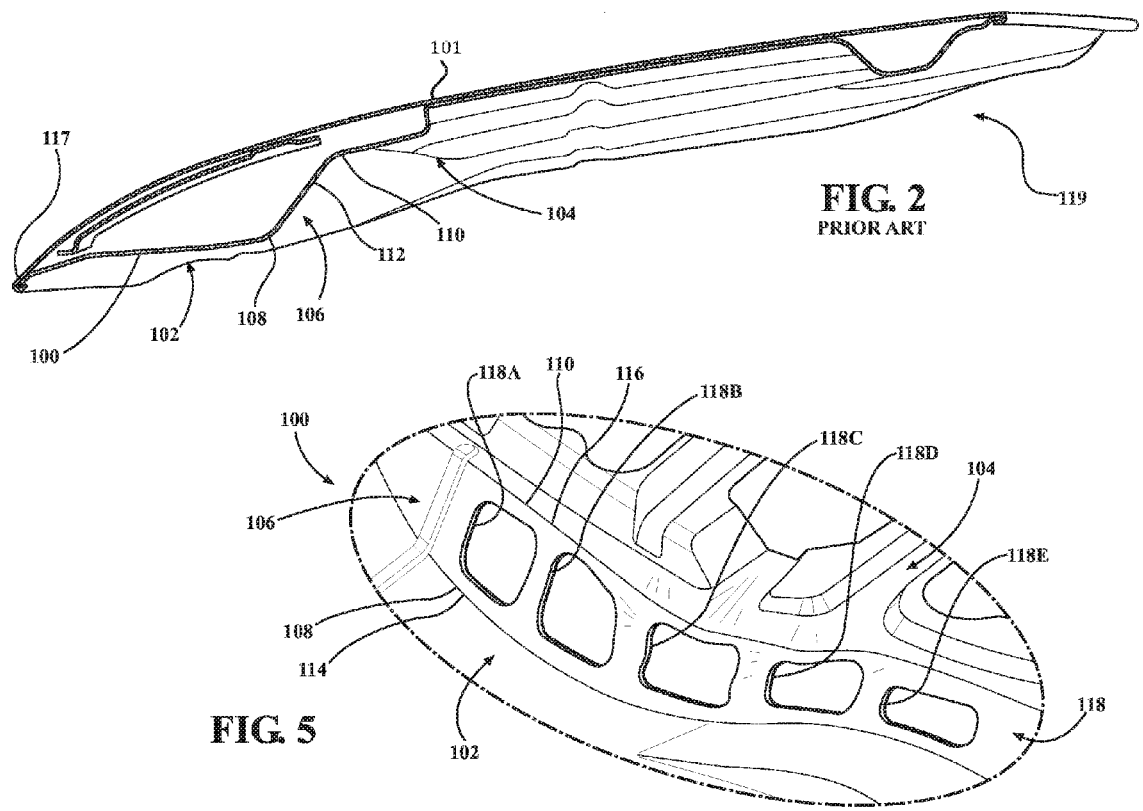

HOOD INNER DESIGN FOR PEDESTRIAN PROTECTION

BACKGROUND

The present hood inner design relates, in general, to vehicle hoods. Pedestrians and other unprotected persons are vulnerable to severe injury when struck by a motor vehicle. In particular, head trauma is the most common cause of severe pedestrian injury and death in vehicle-pedestrian accidents.

SUMMARY

A hood design for improving pedestrian safety during a collision between a pedestrian and a motor vehicle.

In one implementation a hood with increased energy absorption capacity during impact with a pedestrian is disclosed. The hood includes a hood outer skin, a hood inner panel in communication with the hood outer skin and configured to provide structural support to the hood outer skin, the hood inner panel further including: a first region, a second region, and at least one reinforcing structure, each reinforcing structure forming a boundary between the first region and the second region, each reinforcing structure also including a first angled edge comprising a first continuum of vertices at the interface of the first region with one of the at least one reinforcing structure, a second angled edge comprising a second continuum of vertices at the interface of the second region with the reinforcing structure, a bridge section connecting the first angled edge to the second angled edge, and one or more apertures in the at least one reinforcing structure.

In another implementation a vehicle hood inner panel configured to support a hood outer skin is disclosed. The vehicle hood inner panel includes a forward region, a rearward region, and a substantially transverse ridge disposed between the forward region and the rearward region, the transverse ridge further including an angled wall and at least one edge, the hood inner panel also including one or more apertures configured to increase deformability of the substantially transverse ridge.

In some aspects, the apertures can include geometric shapes, irregular shapes, or both geometric and irregular shapes. In some aspects, the one or more apertures can be disposed substantially on the bridge section of the at least one reinforcing structure. In some aspects, the one or more apertures can be disposed substantially across the bridge section and at least one of the first angled edge and the second angled edge. In other aspects, the one or more apertures can be disposed substantially on the first angled edge and extend into the bridge section and at least one of the first region and the second region of the hood inner panel.

BRIEF DESCRIPTION OF THE DRAWINGS

The description herein makes reference to the accompanying drawings wherein like reference numerals refer to like parts throughout the several views, and wherein:

FIG. 2 is a cross sectional view of the prior art hood inner panel shown in FIG. 1;

FIG. 5 is a perspective view of the hood inner panel of FIG. 3, after an impact test, with local deformation around the apertures;

DETAILED DESCRIPTION

A hood with a reinforcing structure and apertures through the reinforcing structure to promote energy absorption upon impact with a pedestrian is described.

Figure 1:
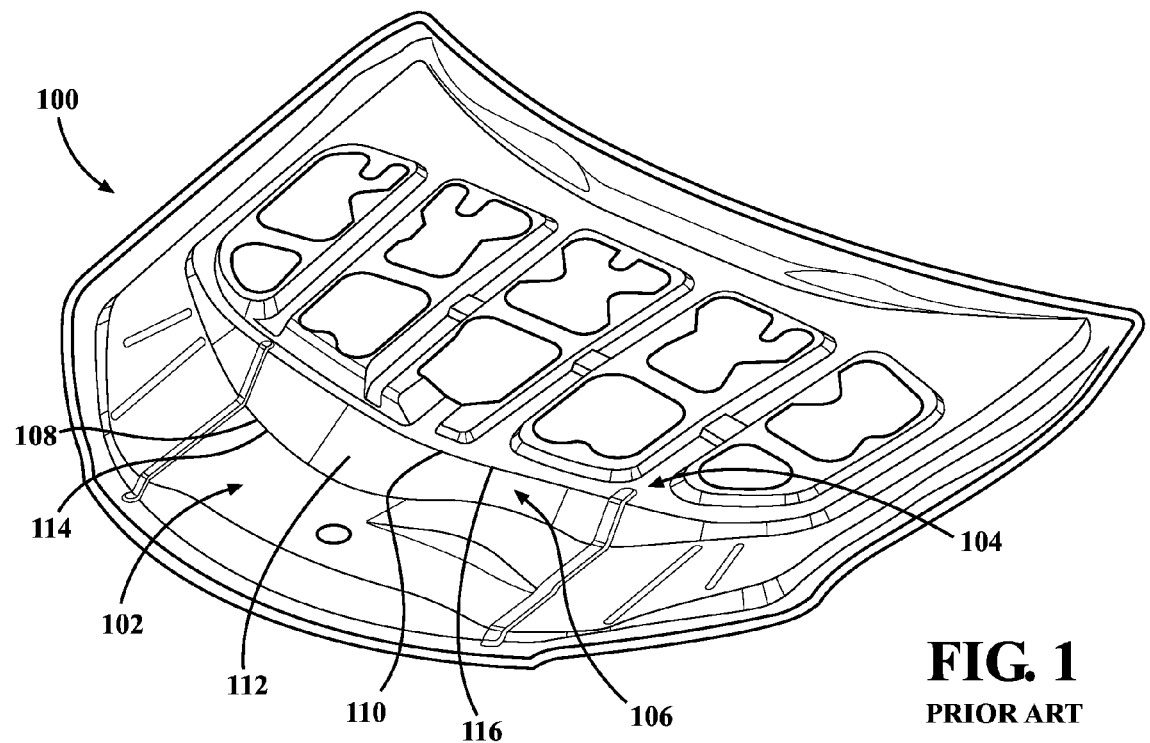
FIG. 1 is a perspective view of a prior art hood inner panel with a reinforcing structure.

FIGS. 1 and 2 show a prior art hood inner panel 100. The orientation of the hood inner panel 100 in FIG. 1 is such that a surface suitable for attachment to a hood outer skin 101 is observed. The hood outer skin 101 is omitted from FIG. 1 for clarity, but is shown in FIG. 2. The hood inner panel 100 includes a first region 102 and a second region 104. In some instances, the first region 102 and the second region 104 can be described as a forward region and a rearward region, respectively, relative to the orientation of the hood with respect to the front of the vehicle. A reinforcing structure 106 largely separates the first region 102 from the second region 104. The reinforcing structure 106 can increase local rigidity of the hood inner panel 100, improving its structural integrity during normal use. In the example of FIG. 1, the reinforcing structure 106 can be alternatively described as a substantially transverse ridge. While the reinforcing structure 106 of FIG. 1 is shown as a single, continuous structure it can in alternative configurations be discontinuous. A reinforcing structure 106 that is discontinuous could alternatively be described as being more than one reinforcing structure 106.

The reinforcing structure 106 of FIG. 1 includes a first angled edge 108, a second angled edge 110, and a bridge section 112. The first angled edge 108 comprises a first continuum of vertices 114, each point in the first continuum of vertices 114 being a vertex of a locally immediate angle between the first region 102 and the bridge section 112. The second angled edge 110 comprises a second continuum of vertices 116, each point in the second continuum of vertices 116 being a vertex of a locally immediate angle between the second region 104 and the bridge section 112. The bridge section 112 can alternatively be described as an angled wall and the first and second angled edges 108, 110 can each be described as an edge.

FIG. 2 shows a cross-sectional view of the prior art hood inner panel 100 of FIG. 1 joined to a hood outer skin 101 to form a hood 117. In the cross-sectional view, the first angled edge 108 forms an obtuse angle between the first region 102 and the bridge section 112. The second angled edge 110 forms an obtuse angle between the second region 104 and the bridge section 112. At various points along the first and second continua of vertices 114,116, each vertex can be of an obtuse or approximately perpendicular angle. Individual vertices of the first and second continua of vertices 114, 116 can be sharp vertices or rounded radius vertices. In some configurations, such as in FIGS. 1 and 2, a cross section of a portion of the bridge section 112 of the reinforcing structure 106 of the hood inner panel 100, connecting any vertex of the first angled edge 108 to the nearest vertex of the second angled edge 110, can be linear.

Figure 3:
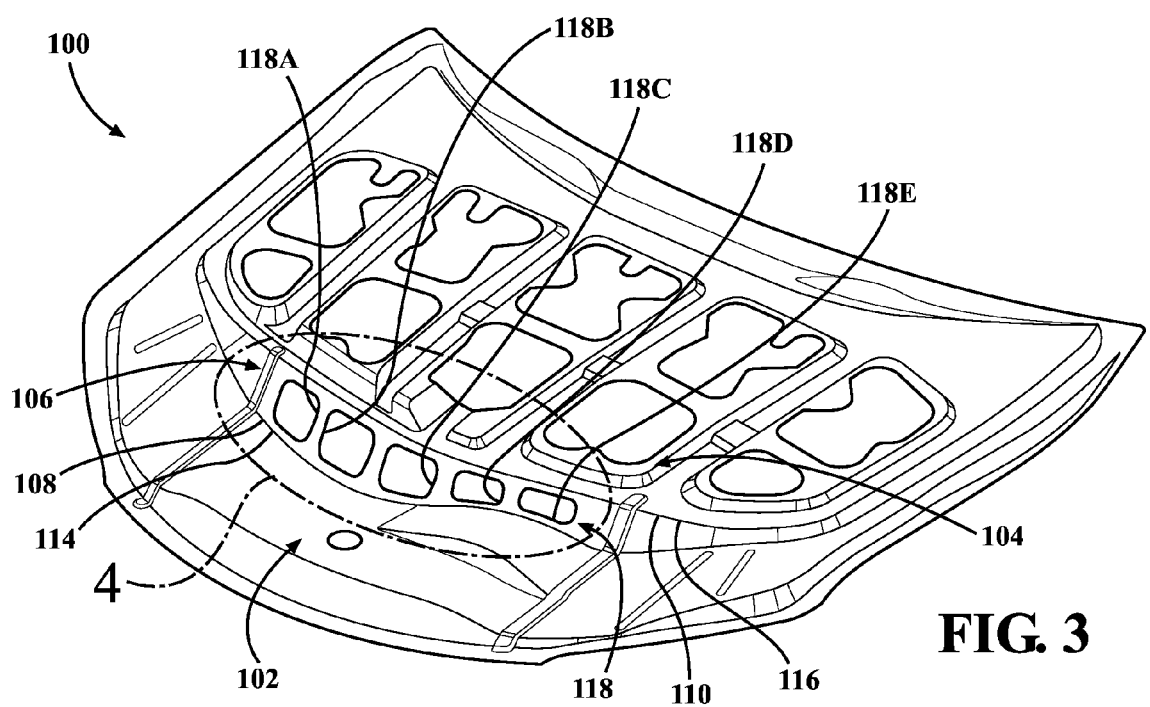
FIG. 3 is a perspective view of one aspect of a hood inner panel with apertures through a bridge section of the reinforcing structure.
Figure 4:
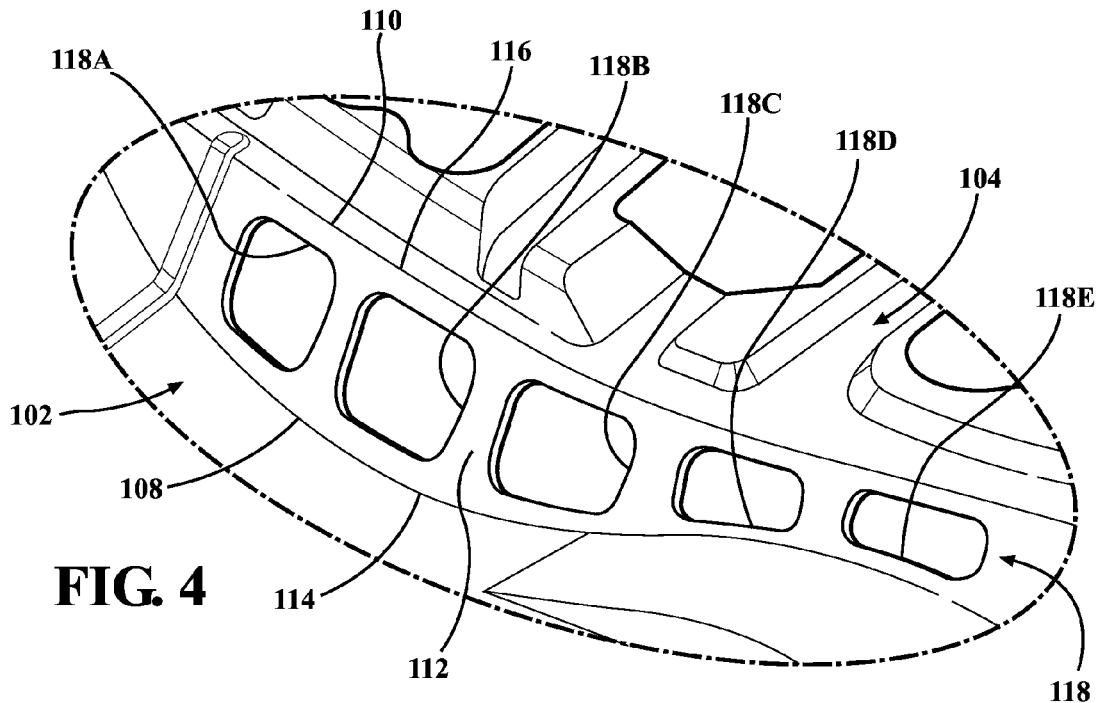
FIG. 4 is an enlarged view of the apertures of the hood inner panel of FIG. 3.

FIGS. 3 and 4 show one aspect of a hood inner panel similar to that of FIG. 1, but modified with apertures 118 perforating the bridge section 112 of the reinforcing structure 106. The apertures 118 can be configured to lessen the rigidity of the reinforcing structure 106 and increase the local deformability and energy absorption of the reinforcing structure 106 in the event of an impact between the hood 117 and an external object. In particular, the apertures 118 can be configured to increase local deformability and energy absorption of the reinforcing structure 106 in the event of a collision between the hood 117 and a pedestrian. The apertures 118 can be particularly useful to increase pedestrian safety by increasing local deformability and energy absorption of the reinforcing structure 106 in the event of an impact between the head of a pedestrian and an area of the hood 117 at or near the reinforcing structure 106. This feature can decrease the severity of pedestrian head injuries caused by vehicle-pedestrian collisions when a pedestrian's head strikes the hood 117. In general, the apertures 118 can provide for a more uniform rigidity distribution across the surface area of the hood 117 by decreasing or fine-tuning the rigidity of the hood inner panel 100 in the immediate vicinity of the reinforcing structure 106.

The hood inner panel 100 as exemplified in FIG. 3 can have one or more apertures 118 through the at least one reinforcing structure 106. Any aperture 118A, 118B, 118C, 118D, or 118E of the one or more apertures 118 can perforate the bridge section 112, the first angled edge 108, or the second angled edge 110. Any aperture 118A, 118B, 118C, 118D, or 118E of the one or more apertures 118 can perforate the bridge section 112 and the first angled edge 108 or the bridge section 112 and the second angled edge 110. Any aperture 118A, 118B, 118C, 118D, or 118E of the one or more apertures 118 can perforate the bridge section 112, the first angled edge 108, and the second angled edge 110. The one or more apertures 118 can be geometric or irregular in shape. For example, the one or more apertures 118 can be substantially circular, oval, triangular, rectangular, square, trapezoidal, or otherwise polygonal. The corners of polygonal apertures can be sharp or radius rounded. Any of the one or more apertures 118 can comprise a combination of the optional shapes. For example, an aperture can be a semicircle in combination with an irregularly shaped feature. In some instances, a portion of the hood inner panel 100 which is perforated by any of the one or more apertures 118 will not be planar. In such instances, the one or more apertures 118 themselves would not be described by the above shapes, but a two dimensional projection of the one or more apertures 118 would be described by the above shapes.

Additionally, while the hood inner panel 100 of FIG. 3 is illustrated with five apertures 118 by way of example, the number of apertures 118 can be smaller or greater depending, for example, on the size and shape of the hood 117, the hood inner panel 100, or the reinforcing structure 106. The aspect of the hood inner panel 100 in FIG. 4 has one or more apertures 118 which perforate only the bridge section 112 of the reinforcing structure 106 of the hood inner panel 100. Each of the one or more apertures 118 of FIG. 4 is substantially quadrilateral with rounded radius corners. Some of the one or more apertures 118 of FIG. 4 are substantially rectangular with rounded radius corners. At least one of the one or more apertures 118 of FIG. 4 is substantially square with rounded radius corners, for example aperture 118B.

FIG. 5 shows local deformation of the hood inner panel 100 of FIG. 3 caused by a headform impact test. As can be seen by comparison of FIG. 5 to FIG. 4, headform impact has caused partial collapse of apertures 118B, 118C, and 118D and has caused localized bending near the same individual apertures, indicated by straight-line surface shading.

Figure 6:
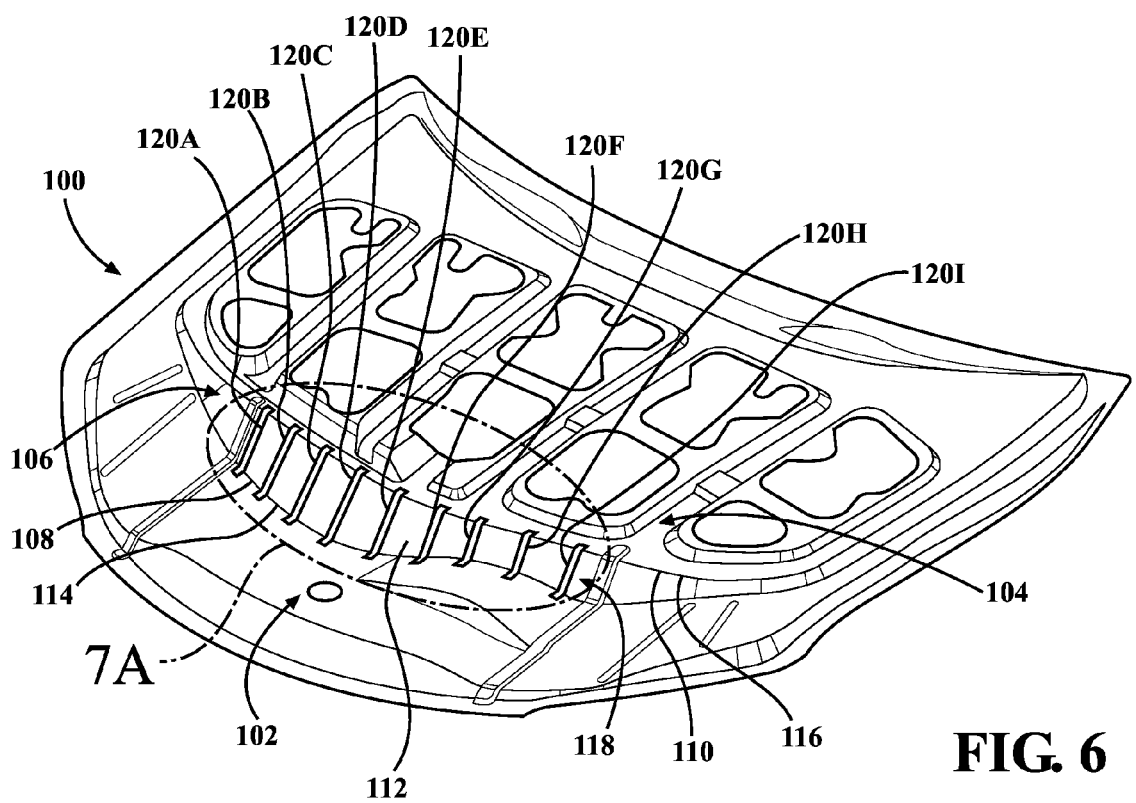
FIG. 6 is a perspective view of another aspect of a hood inner panel with apertures through the bridge section, a first angled edge, and a second angled edge of the reinforcing structure.
Figure 7A:
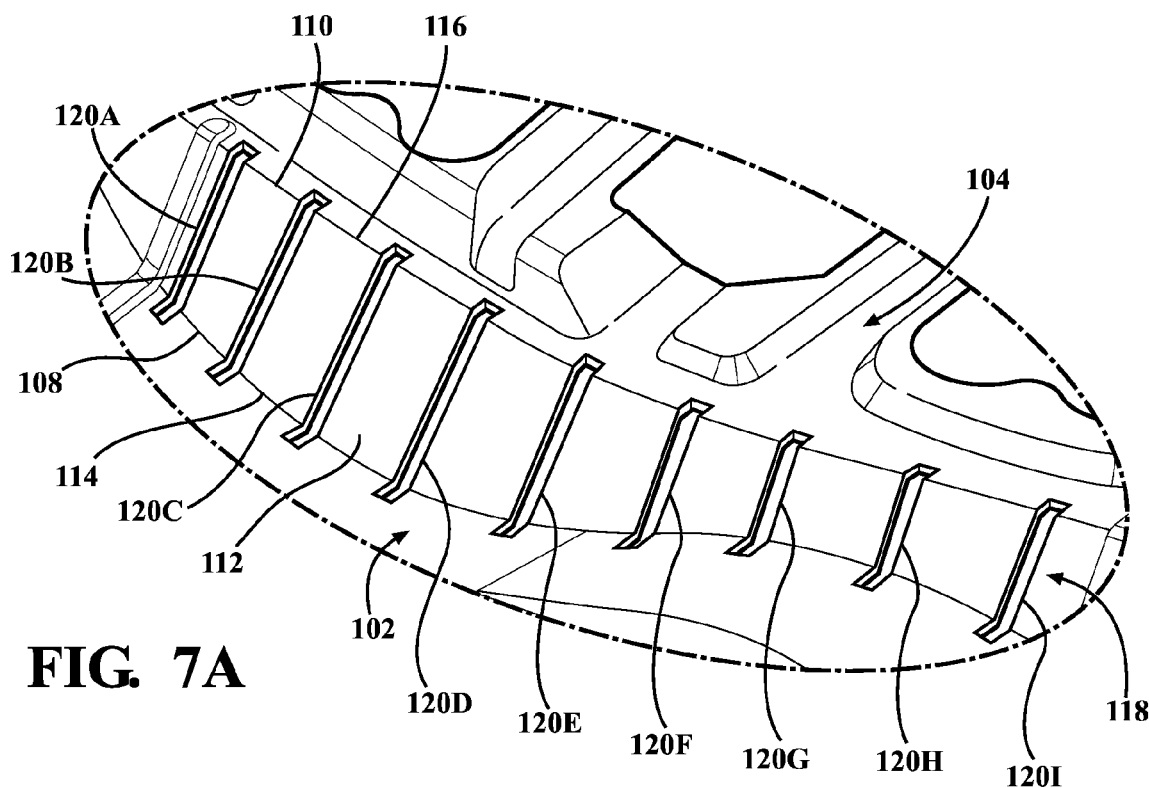
FIG. 7A is an enlarged view of one aspect of the apertures of the hood inner panel of FIG. 6.

In an alternative configuration, as shown in FIGS. 6 and 7A, the one or more apertures 118 through the reinforcing structure 106 can include one or more slots 120A, 120B, 120C, 120D, 120E, 120F, 120G, 120H, and 120I. In some aspects, any of the one or more slots 120A-120I can perforate only the bridge section 112 of the reinforcing structure 106. In other aspects, any of the one or more slots 120A-120I can perforate the bridge section 112 and the first angled edge 108 or the bridge section 112 and the second angled edge 110. In yet other aspects, as in the example of FIGS. 6 and 7A, any of the one or more slots 120A-120I can perforate the bridge section 112, the first angled edge 108, and the second angled edge 110. Any of the one or more slots 120A-120I which perforate only the bridge section 112 of the reinforcing structure 106 can be rectangular, with a pair of opposing, long sides parallel to one another and separated by a pair of opposing, short sides perpendicular to the long sides. The pair of opposing, parallel long sides can be substantially perpendicular to the first angled edge 108 or the second angled edge 110.

The enlarged view of the one or more slots 120A-120I in FIG. 7A shows more clearly the example in which one or more slots 120A-120I perforate the bridge section 112, the first angled edge 108, and the second angled edge 110. Individual slots, for example slot 120A, which perforate the bridge section 112, the first angled edge 108, and the second angled edge 110 can have a shape which is rectangle-like. A two-dimensional projection of any of the one or more slots 120A-120I of FIG. 7 would be rectangular, but the slots themselves are not because the portions of the hood inner panel 100 which they perforate are not planar.

Figure 7B:
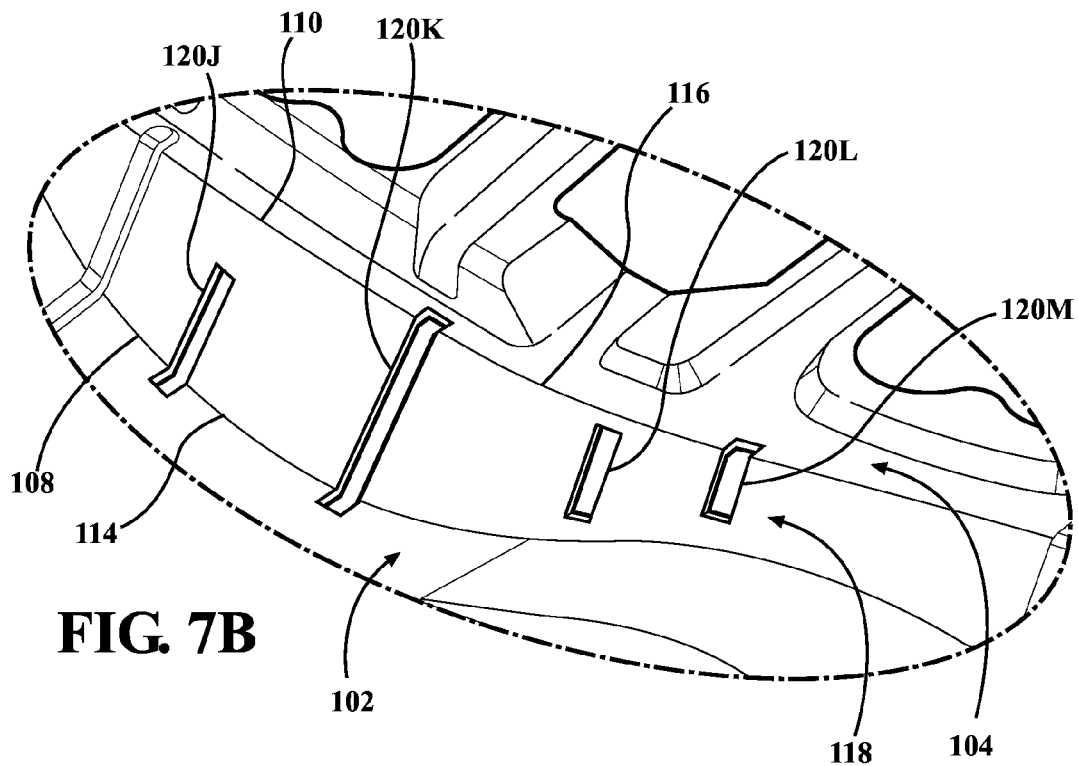
FIG. 7B is an enlarged view of another aspect of apertures of a hood inner panel such as that of FIG. 6.

Another alternative configuration of a hood inner panel 100, in which the reinforcing structure 106 is modified with one or more slots 120J, 120K, 120L and 120M, is shown in FIG. 7B. The additional alternative configuration shows one example of a slot 120J which perforates the bridge section 112 and the first angled edge 108; a slot 120K which perforates the bridge section 112, the first angled edge 108, and the second angled edge 110; a slot 120L which perforates only the bridge section 112; and a slot 120M which perforates the bridge section 112 and the second angled edge 110. As is obvious from comparison of FIGS. 7A and 7B, a hood inner panel 100 bearing a reinforcing structure 106 which is modified with one or more slots 120A-120I, for example, need not be limited in the number of the one or more slots 120J-120M, for example, so modifying. Rather, the number or configuration of slots 120A-120I, for example, can be adapted to the needs and limitations of the hood 117.

Figure 8:
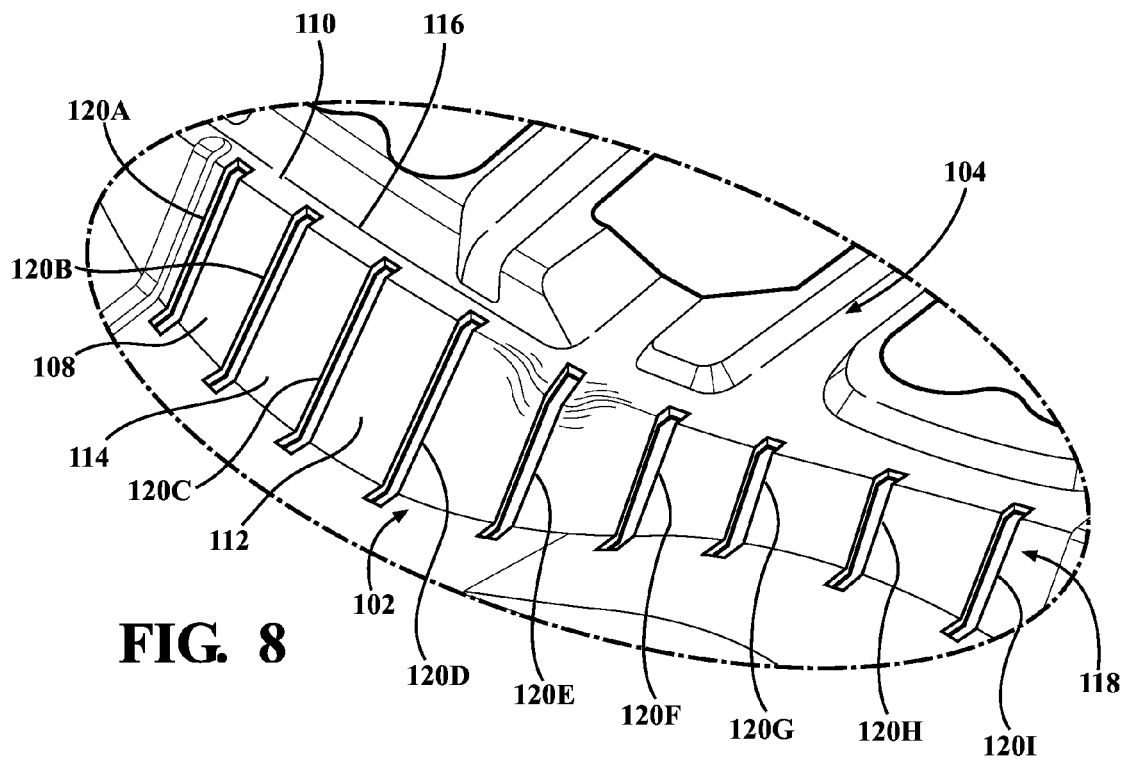
FIG. 8 is a perspective view of the hood inner panel of FIG. 6, after an impact test, with local deformation around the apertures.

The results of a headform impact test on a hood 117 with the hood inner panel 100 of FIGS. 6, 7A, as shown in FIG. 8, indicate significant deformation in and around the one or more slots 120A-120I. In particular, the slot 120D and slot 120E have been partially collapsed and the surfaces of bridge section 112 and of the second region 104 near slot 120D and slot 120E have been significantly deformed, as indicated by straight-line surface shading.

Figure 9:
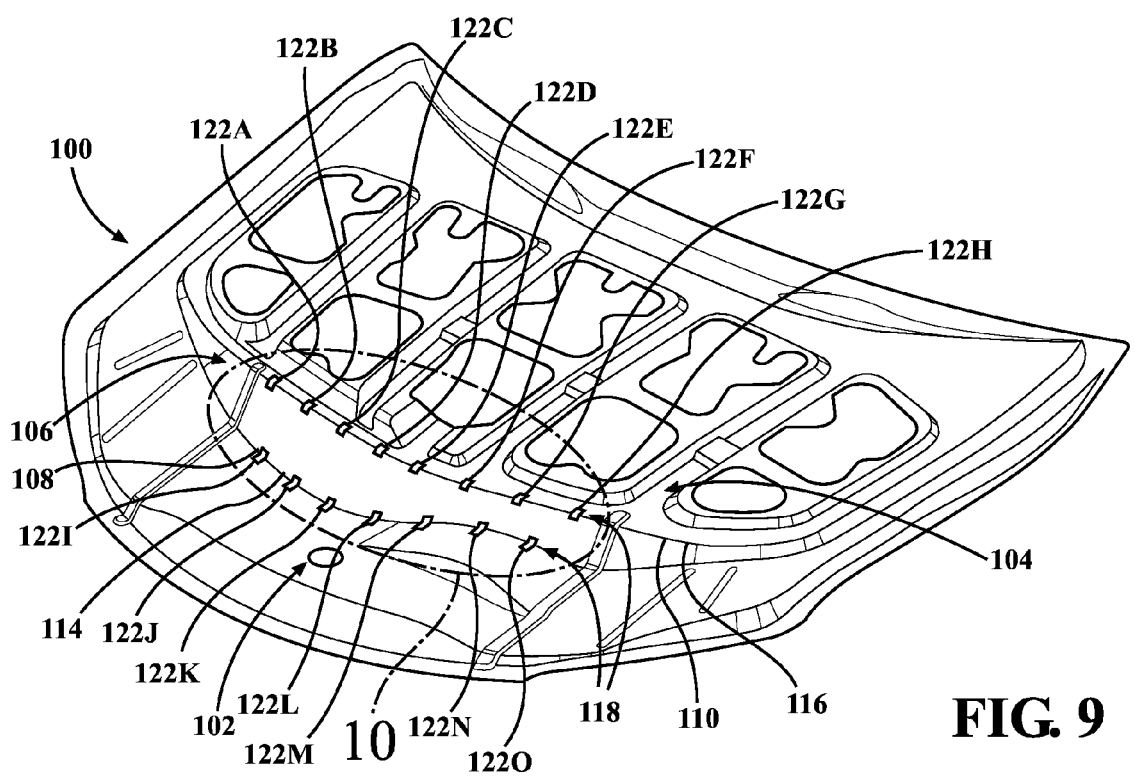
FIG. 9 is a perspective view of another aspect of a hood inner panel with apertures through a first angled edge and a second angled edge of the reinforcing structure.
Figure 10:
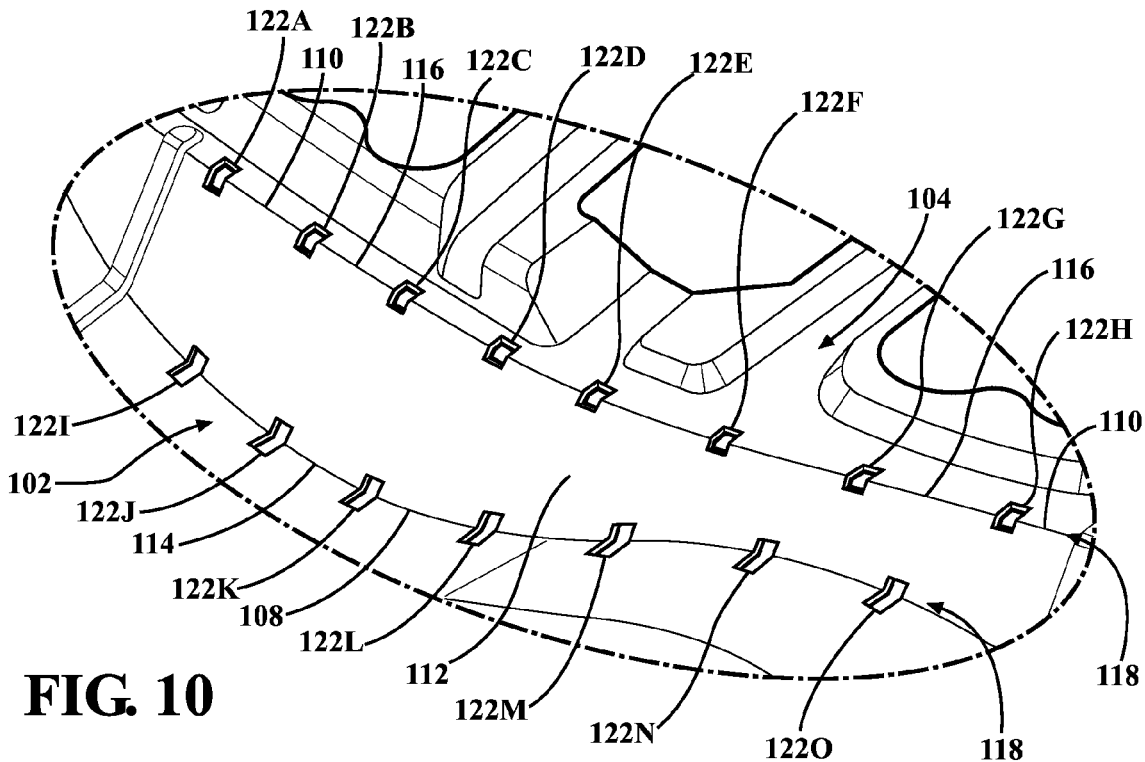
FIG. 10 is an enlarged view of the apertures of the hood inner panel of FIG. 9.

In another alternative configuration, as shown in FIGS. 9 and 10, the one or more apertures 118 in the reinforcing structure 106 of hood inner panel 100 can include one or more edge-perforating apertures 122A-122O. An edge-perforating aperture 122A-122O can be defined as any of the one or more apertures 120A-122O which perforates the first angled edge 108 or the second angled edge 110 with a minor perforation of the bridge section 112. The phrase "minor perforation of the bridge section 112" can refer to the situation where one or more edge-perforating apertures 122A-122O extend less than about 50% of the shortest distance from the angled edge 108, 110 so perforated to the other angled edge 110, 108 of the reinforcing structure 106. The phrase can alternatively refer to the situation where one or more edge-perforating apertures 122A-122O extend less than about 25% of the shortest distance from the angled edge 108, 110 so perforated to the other angled edge 110, 108. The phrase can alternatively refer to the situation where one or more edge-perforating apertures 122A-122O extend less than about 10% of the shortest distance from the angled edge 108, 110 so perforated to the other angled edge 110, 108. In some configurations, as exemplified in FIGS. 9 and 10, one or more edge-perforating apertures 122A-122O which perforate the first angled edge 108 can extend into the first region 102 to a distance similar to that which they extend into the bridge section 112. In some configurations, as also exemplified in FIGS. 9 and 10, one or more edge-perforating apertures 122A-122O which perforate the second angled edge 110 can extend into the second region 104 to a distance similar to that which they extend into the bridge section 112. While the example of FIGS. 9 and 10 is shown with fifteen edge-perforating apertures 122A-122O, the number can be smaller or larger, depending, for example, on the size and shape of the hood 117, the hood inner panel 100, or the reinforcing structure 106.

Figure 11:
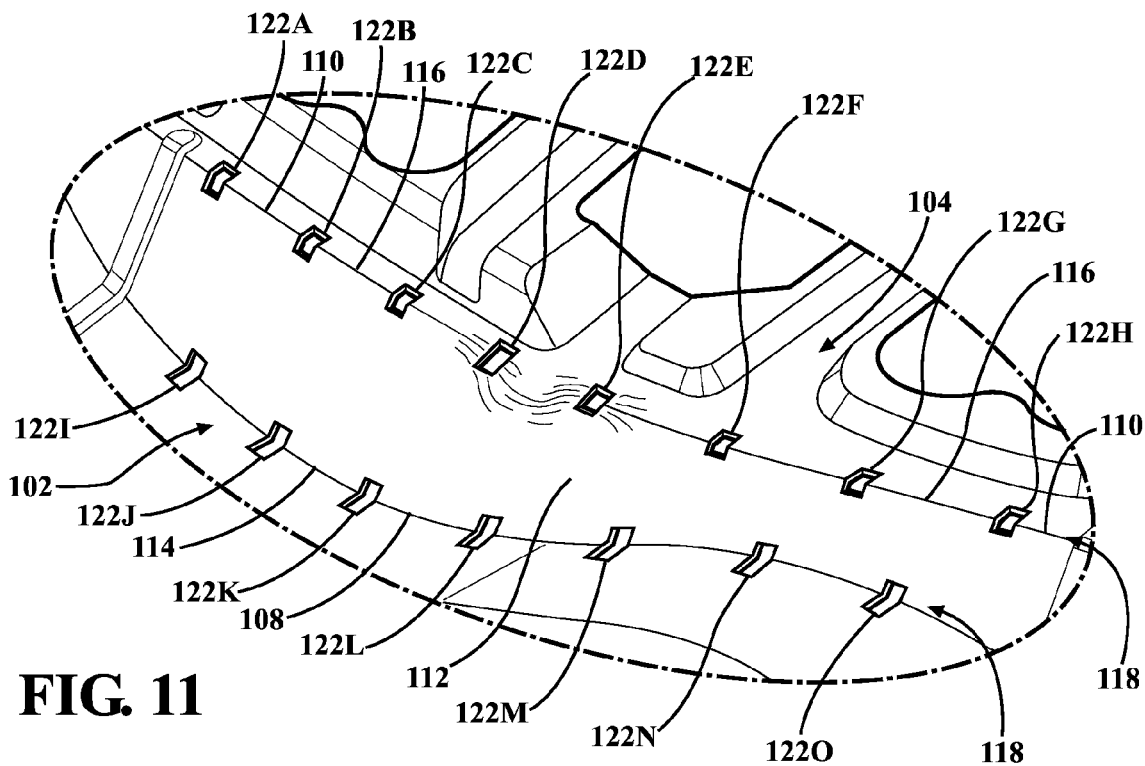
FIG. 11 is a perspective view of the hood inner panel of FIG. 9, after an impact test, with local deformation around the apertures.

The results of a headform impact test of a hood 117 with the hood inner panel 100 of FIGS. 9 and 10 are shown in FIG. 11. Significant local deformation in the vicinity of edge-perforating apertures 122D, 122E resulting from headform impact is indicated by straight-line surface shading.

While different aspects and configurations of the hood inner panel 100 of the present disclosure show the use of various aspects of apertures 118, such as slots 120A-120I or edge-perforating apertures 122A-122O, used in relative uniformity, various aspects of apertures 118 can be used in combination with one another. For example, apertures 118 which are substantially square-like or ovoid can be used in combination with any variety of slots 120A-120I or of edge-perforating apertures 122A-122O.

Also, while the hood inner panel 100 described here can in many configurations be adapted for use with a front engine vehicle it can in other configurations be adapted for use with a rear engine vehicle.

The foregoing description relates to what are presently considered to be the most practical configurations. It is to be understood, however, that the disclosure is not to be limited to these configurations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hood of a motor vehicle, comprising:
   a hood outer skin;
   a hood inner panel in communication with the hood outer skin and configured to provide structural support to the hood outer skin, the hood inner panel further including:
   a first region;
   a second region; and
   at least one reinforcing structure forming a boundary between the first region and the second region, the at least one reinforcing structure including:
   a first angled edge comprising a continuum of vertices at the interface of the first region with the at least one reinforcing structures;
   a second angled edge comprising a continuum of vertices at an interface of the second region with the at least one reinforcing structure;
   a bridge section connecting the first angled edge to the second angled edge, the bridge section approaching the hood outer skin in the direction of the first angled edge to the second angled edge; and
   a plurality of apertures in the at least one reinforcing structure, the plurality of apertures being disposed substantially on at least one of the first angled edge or the second angled edge, the plurality of apertures including a portion that extends into at least one of the bridge section and a respective one of the first region and the second region, the portion being a minor perforation, the minor perforation of the bridge section being less than about 25% of the shortest distance from the first angled edge to the second angled edge, the minor perforation of the respective one of the first region and the second region being less than about 25% of the shortest distance from the respective one of the first angled edge and the second angled edge to an end of the respective one of the first region and the second region in a longitudinal direction of the hood inner panel,
   each of the first region and the second region being affixed to the hood outer skin, and at least a portion of the inner hood panel directly contacting the hood outer skin.

2. The hood of claim 1, wherein a cross section of a portion of the bridge section of the reinforcing structure of the hood inner panel connecting any vertex of the first angled edge to the nearest vertex of the second angled edge is linear.

3. The hood of claim 1, wherein the at least one reinforcing structure comprises an angled wall, disposed substantially laterally across the hood inner panel.

4. The hood of claim 1, wherein the plurality of apertures are configured to increase hood energy absorption during impact with a pedestrian.

5. The hood of claim 1, wherein the plurality of apertures comprise a geometric or irregular shape.

6. The hood of claim L wherein the plurality of apertures are disposed substantially on the first angled edge and the second angled edge.

7. The hood of claim 1, wherein the minor perforation of the bridge section being less than about 10% of the shortest distance from the first angled edge to the second angled edge, the minor perforation of the respective one of the first region and the second region being less than about 10% of the shortest distance from the respective one of the first angled edge and the second angled edge to an end of the respective one of the first region and the second region in the longitudinal direction of the hood inner panel.

8. A vehicle hood inner panel configured to support a hood outer skin, the vehicle hood inner panel comprising:
   a forward region;
   a rearward region; and
   a substantially transverse ridge disposed between the forward region and the rearward region, the substantially transverse ridge further including:

an angled wall, the angled wall being configured to approach a hood outer skin in the direction of the forward region to the rearward region;

a first edge formed at an interface between the forward region and the substantially transverse ridge;

a second edge formed at an interface between the rearward region and the substantially transverse ridge; and a plurality of enclosed apertures configured to increase deformability of the substantially transverse ridge, the plurality of enclosed apertures being disposed substantially on at least one of the first edge or the second edge, the plurality of enclosed apertures including a portion that extends into at least one of the angled wall and a respective one of the forward region and the rearward region, the portion being a minor perforation, the minor perforation of the angled wall being less than about 25% of the shortest distance from the first edge to the second edge, the minor perforation of the respective one of the forward region and the rearward region being less than about 25% of the shortest distance from the respective one of the first edge and the second edge to an end of the respective one of the forward region and the rearward region in a longitudinal direction of the hood inner panel;

each of the forward region and the rearward region being configured to be affixed to a hood outer skin, and at least a portion of the inner hood panel directly contacting the hood outer skin.

9. The vehicle hood inner panel of claim 8, wherein the plurality of enclosed apertures are further configured to increase hood energy absorption during impact with a pedestrian.

10. The vehicle hood inner panel of claim 8, wherein the plurality of enclosed apertures comprise a geometric shape, a non-geometric shape, or a combination thereof.

11. The vehicle hood inner panel of claim 8, wherein a plane of the angled wall forms an angle relative to a plane of the rearward region that is one of obtuse and perpendicular.

12. The vehicle hood inner panel of claim 8, wherein a plane of the angled wall forms an angle relative to a plane of the forward region that is one of obtuse and perpendicular.

13. The vehicle hood inner panel of claim 8, wherein the plurality of enclosed apertures are configured to increase deformability of the substantially transverse ridge during impact between a pedestrian and a hood with the hood inner panel.

14. The vehicle hood inner panel of claim 8, wherein the plurality of apertures are disposed substantially on the first edge and the second edge.

15. The vehicle hood inner panel of claim 8, wherein the minor perforation of the angled wall being less than about 10% of the shortest distance from the first edge to the second edge, the minor perforation of the respective one of the forward region and the rearward region being less than about 10% of the shortest distance from the respective one of the first edge and the second edge to an end of the respective one of the forward region and the rearward region in the longitudinal direction of the hood inner panel.

* * * * *